F. L. GIENANDT.
EGG WHIP.
APPLICATION FILED MAY 7, 1909.

944,781.

Patented Dec. 28, 1909.

Witnesses:
Horace A. Crossman
Robert H. Kammler

Inventor:
Fritz L. Gienandt
by Emery & Booth
Attys

UNITED STATES PATENT OFFICE.

FRITZ L. GIENANDT, OF BOSTON, MASSACHUSETTS.

EGG-WHIP.

944,781.　　　　　Specification of Letters Patent.　　Patented Dec. 28, 1909.

Application filed May 7, 1909. Serial No. 494,645.

*To all whom it may concern:*

Be it known that I, FRITZ L. GIENANDT, a citizen of the United States, and a resident of Boston, in the county of Suffolk and Commonwealth of Massachusetts, have invented an Improvement in Egg-Whips, of which the following description, in connection with the accompanying drawings, is a specification, like numerals on the drawings representing like parts.

My invention relates to an egg whip, commonly employed for beating or whipping eggs, cream and other materials used in cooking, although it may conveniently be used for other purposes.

Figure 1:
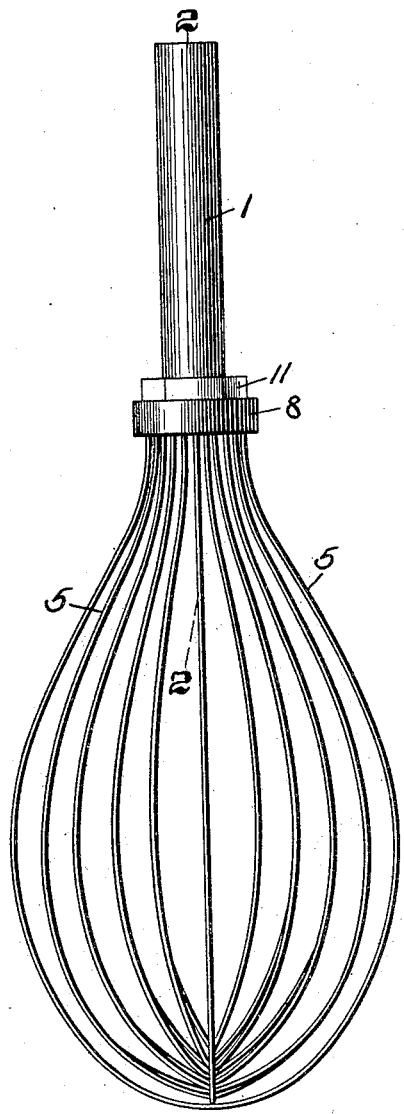
Figure 2:
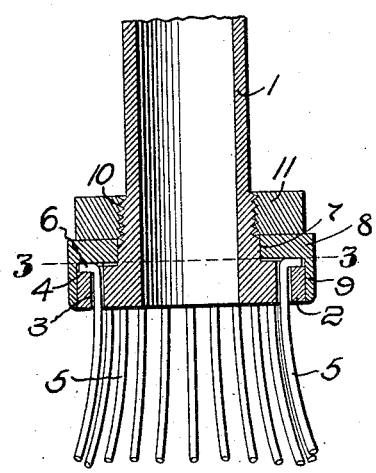

In the particular embodiment of my invention selected for illustration and description herein: Figure 1 is an elevation thereof; Fig. 2, an enlarged vertical sectional detail on the line 2—2, Fig. 1; and Fig. 3, a cross section on the line 3—3, Fig. 2.

Figure 3:
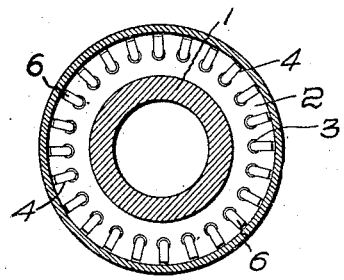

Referring first to Fig. 1, my improved whip comprises a handle 1, preferably hollow, as shown, and provided at its lower end with a flange 2 of suitable width and thickness. The handle may be of any desired and convenient outline and material, the one shown herein being tubular in form and of aluminum, this metal being both light in weight and tough. The flange 2 is provided with a series of vertical passages 3, said series extending preferably entirely around said flange Fig. 3, and the upper face of said flange Fig. 3, is provided with a series of, herein half-round, grooves 4, preferably somewhat less in depth than the diameters of said passages 3, each groove registering with a passage 3 and extending preferably to the outer edge of the flange.

The beating or whipping members comprise a plurality of flexible and herein loop wire members 5, the loops being formed by appropriately bending the central portions of the members 5 upon themselves and passing the two ends 6 thereof through preferably diametrically opposite passages 3 in the flange 2. The said ends 6 are then bent sharply outward, Fig. 2, and laid in the grooves 4. By similarly securing additional wires in the other passages and grooves a whip is formed, substantially cylindrical in cross section, the diameter of which will obviously be determined by the form given to the loops. I have found that a loop of egg or elliptical shape is most convenient. Each succeeding wire, as the loop is formed, may be carried below the loops already formed or the wires may be alternately carried below and above or within the previously formed loops.

Adjoining the flange 2, on the handle 1, is a shoulder 7, which receives loosely the collar 8, provided with a flange 9, that overlies and conceals the out-turned ends of the wires. This collar serves to clamp the out-turned ends of the wires in their grooves 4 in the flange 2, the collar itself being acted upon by a clamping nut 10 threaded at 11 upon the handle 1.

In use the wear comes principally upon the lower or loop portions of the wires 5 and continued use frequently causes the wires to break. In such cases the individual broken wires may be easily replaced by new ones by simply loosening the nut 10 and sliding the collar 8 upward, which permits any particular wire to be withdrawn at will. This removal can be effected in a few minutes and at any place, thereby often saving delay when delay would be extremely inconvenient, and also saving the expense of a new whip.

By making the handle 1 hollow, the surface of what would otherwise be the butt of the handle located within the ends 6 of the wires 5 is reduced to small dimensions, offering less opportunity for the lodgment of particles of food and said surface is rendered more easy to keep clean.

My improved egg whip is at once inexpensive to make, easy to repair, easy to keep clean, of light weight and therefore convenient to use.

Claims—

1. An egg whip comprising, in combination, a handle provided with an outwardly extended flange having passages therein, whip end receiving depressions in one face of said flange and registering with said passages, whip members received by said flange having outwardly bent ends overlying and received by said depressions and a locking member encircling said handle adapted to lock said bent whip ends into said depressions.

2. An egg whip comprising, in combination, a handle provided with an outwardly extended flange having passages therethrough in a plane substantially parallel with but without the outer face of said handle and having grooves upon one face of said flange registering with said passages, whip members having outwardly extended ends received by said grooves, the diameter of said whip ends exceeding the depth of said grooves, a collar provided with a laterally extended flange to close the ends of said grooves and a locking member threaded upon the outer face of said handle to lock said whip ends between said collar and said flange.

In testimony whereof I have signed my name to this specification, in the presence of two subscribing witnesses.

FRITZ L. GIENANDT.

Witnesses:
 EVERETT S. EMERY,
 ROBERT H. KAMMLER.